(12) United States Patent
Ferrandini et al.

(10) Patent No.: US 12,545,446 B2
(45) Date of Patent: Feb. 10, 2026

(54) TECHNIQUES FOR PREVIEWING AND COMPOSING PANORAMIC PHOTOGRAPHS USING UAV NAVIGATION CAMERAS

(71) Applicant: Skydio, Inc., San Mateo, CA (US)

(72) Inventors: James Anthony Ferrandini, San Rafael, CA (US); Noah Brian Greene, Astoria, NY (US); Charles Vanschoonhoven Wood, Cazenovia, NY (US); Saumya Pravinbhai Shah, Sunnyvale, CA (US); Shreyas Arora, Fremont, CA (US); Kristen Marie Holtz, Menlo Park, CA (US)

(73) Assignee: Skydio, Inc., San Mateo, CA (US)

( * ) Notice: Subject to any disclaimer, the term of this patent is extended or adjusted under 35 U.S.C. 154(b) by 154 days.

(21) Appl. No.: 18/500,037

(22) Filed: Nov. 1, 2023

(65) Prior Publication Data

US 2024/0140625 A1 May 2, 2024

Related U.S. Application Data

(60) Provisional application No. 63/381,900, filed on Nov. 1, 2022.

(51) Int. Cl.
*B64U 20/87* (2023.01)
*B64U 20/83* (2023.01)
*G03B 37/02* (2021.01)
*B64U 101/30* (2023.01)

(52) U.S. Cl.
CPC ............ *B64U 20/87* (2023.01); *B64U 20/83* (2023.01); *G03B 37/02* (2013.01); *B64U 2101/30* (2023.01); *B64U 2201/20* (2023.01)

(58) Field of Classification Search
None
See application file for complete search history.

(56) References Cited

U.S. PATENT DOCUMENTS

| 2016/0198088 A1* | 7/2016 | Wang | B64U 20/87 348/36 |
| 2019/0329903 A1* | 10/2019 | Thompson | G06V 20/13 |

* cited by examiner

*Primary Examiner* — Heather R Jones

(57) ABSTRACT

Described herein are unmanned aerial vehicles (UAVs), systems, and methods for capturing panoramic images using cameras onboard a UAV. For example, an embodiment pertains to a UAV including a flight control system, a propulsion system operatively coupled with the flight control system, and an image system comprising navigational cameras and a gimbal camera. The image system is configured to capture a first set of images of a scene using the navigational cameras, stitch the first set of images together to create a first panoramic image of the scene, identify a flight plan for capturing a second set of images with which to create a second panoramic image of the scene using the gimbal camera, capture the second set of images of the scene using the gimbal camera, and stitch the second set of images together to create the second panoramic image.

20 Claims, 8 Drawing Sheets

TECHNIQUES FOR PREVIEWING AND COMPOSING PANORAMIC PHOTOGRAPHS USING UAV NAVIGATION CAMERAS

CROSS-REFERENCE TO RELATED APPLICATION

This application claims priority to U.S. Provisional Patent Application No. 63/381,900 titled "TECHNIQUES FOR PREVIEWING AND COMPOSING PANORAMIC PHOTOGRAPHS USING UAV NAVIGATION CAMERAS," filed on Nov. 1, 2022, which is incorporated herein by reference in its entirety for all purposes.

TECHNICAL FIELD

Various embodiments of the present technology relate to unmanned aerial vehicles (UAVs) and systems, methods, and devices for capturing panoramic images using cameras onboard the UAVs.

BACKGROUND

Unmanned aerial vehicles (i.e., drones) can be extremely useful for capturing videos, images, and other data from vantage points or access locations that would otherwise be difficult to reach. Accordingly, drones are increasingly being utilized for recreation, military and intelligence gathering, and enterprise uses. The flight, data-gathering, and other capabilities of a drone can be controlled by an operator at a remote location, autonomously via control systems onboard the drone, or in some combined manner.

UAVs comprise frames to support onboard equipment, such as avionics, propulsion systems, antennas, batteries, cameras, sensors, and the like. Propulsion systems can include propellors, motors, engines, or similar flight-capable machinery. Avionics systems serve to navigate the UAV and guide the propulsion systems in flight. For navigation, UAVs typically rely on multiple onboard sensors and communication systems. For example, antennas may be utilized to wirelessly communicate with a remote controller to transmit data such as position and velocity and to receive flight and operational commands. UAVs may also include cameras to capture visual data that may be used for navigational purposes and for image capture purposes. With respect to image capture functionality, operators of UAVs may maneuver the UAV into various positions until they find a position to capture a desired image. This may deplete a UAV's battery more quickly as UAV's may require several maneuvers to position a primarily, front-facing camera towards a scene at a desired angle, height, or other position.

Overview

An unmanned aerial vehicle (UAV) is disclosed herein that utilizes navigational cameras onboard the UAV to capture a first panoramic image, or a preview of a panoramic image, and a gimbal camera onboard the UAV to capture a second panoramic image based on the panoramic preview captured by the navigational cameras. Previewing panoramic images before capture using high-resolution gimbal cameras may provide at least one or more benefits such as conserving power.

In an embodiment, a UAV that includes a flight control system, a propulsion system operatively coupled with the flight control system and configured to propel the UAV as directed by the flight control system, and an image system comprising navigational cameras and a gimbal camera is provided. The image system is configured to capture a first set of images of a scene using the navigational cameras, wherein each one of the first set of images corresponds to a different one of the navigational cameras, stitch the first set of images together to create a first panoramic image of the scene, identify a flight plan for capturing a second set of images with which to create a second panoramic image of the scene using the gimbal camera, while executing the flight plan via the propulsion system, capture the second set of images of the scene using the gimbal camera, and stitch the second set of images together to create the second panoramic image.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
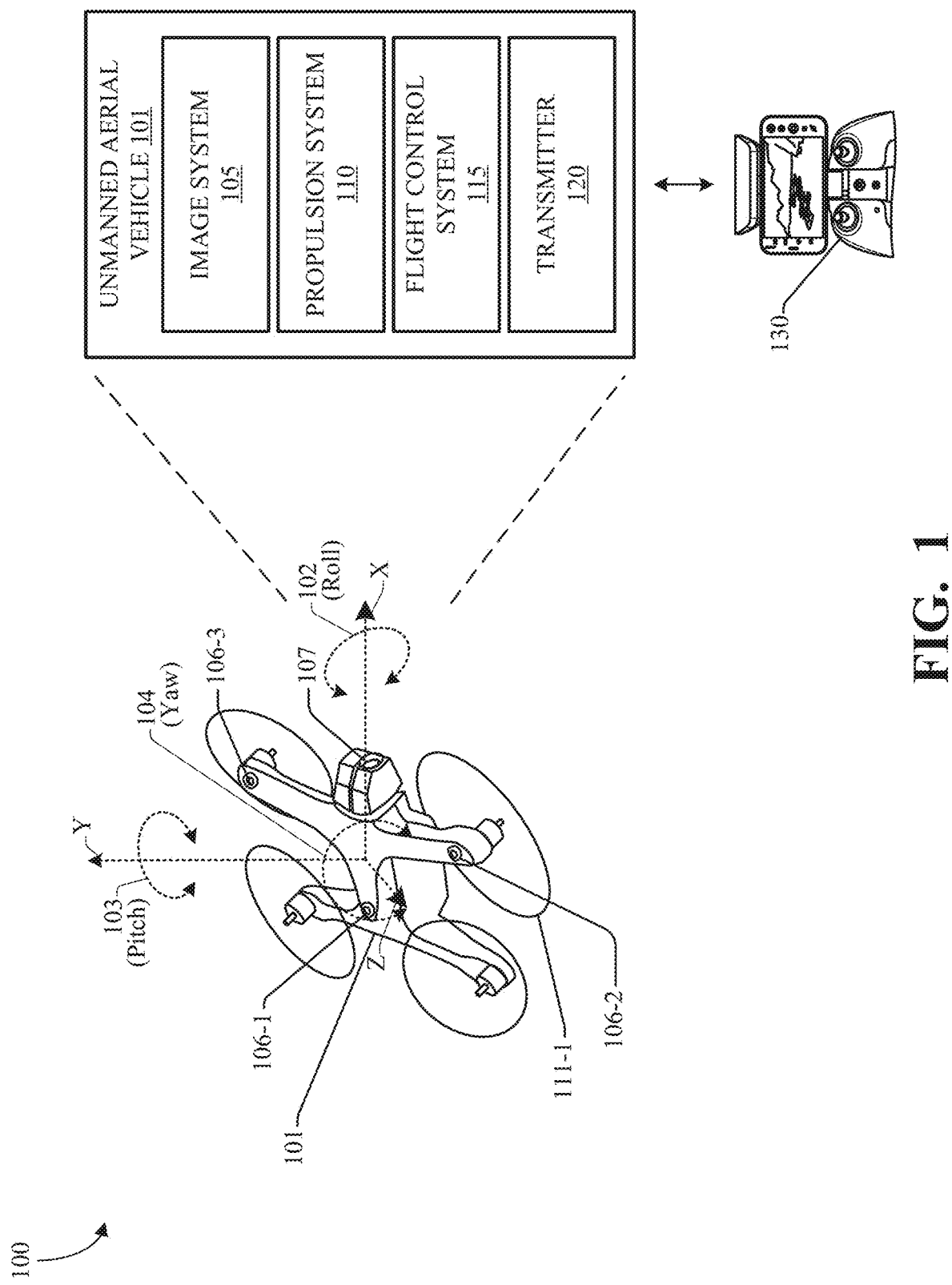
FIG. 1 illustrates an exemplary operating architecture of an unmanned aerial vehicle in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology relate to unmanned aerial vehicles (UAVs) and capturing previews of aerial panoramic images using navigational cameras before capturing a panoramic image using a high-resolution gimbal camera onboard a UAV. A UAV comprises a body or frame that supports multiple navigational cameras and a gimbal camera. A flight control system onboard the UAV is configured to communicate with a remote receiver using antennas onboard the UAV. The remote receiver can be a remote controller, a ground/docking station, a satellite, or the like. The UAV also comprises a propulsion system made up of propellers, motors, or the like, to fly the UAV pursuant to directions from the flight control system. The flight control system is operatively coupled with the propulsion system to perform flight and navigation functions. Navigation functions may be facilitated by the use of both the antennas and the navigational cameras onboard the UAV, among other components.

During operation, a UAV may capture visual data using both navigational cameras and a gimbal camera. The navigational cameras may typically include wide-angle cameras used to produce visual data for flight guidance, reference points while flying, and other navigational purposes, while a gimbal camera may typically be used to view scenes, objects, and capture high-resolution images and videos. Navigational cameras may produce lower quality image data as the data collected by navigational cameras is not often used for capturing images and videos, unlike gimbal cameras. However, such lower-quality image data may be used to generate previews of panoramic images that may be captured in higher-quality by the gimbal camera before the UAV maneuvers into a position to capture the higher-quality image data.

In an embodiment, a UAV that includes a flight control system, a propulsion system operatively coupled with the flight control system and configured to propel the UAV as directed by the flight control system, and an image system comprising navigational cameras and a gimbal camera is provided. The image system is configured to capture a first set of images of a scene using the navigational cameras, wherein each one of the first set of images corresponds to a different one of the navigational cameras, stitch the first set of images together to create a first panoramic image of the scene, identify a flight plan for capturing a second set of images with which to create a second panoramic image of the scene using the gimbal camera, while executing the flight plan via the propulsion system, capture the second set of images of the scene using the gimbal camera, and stitch the second set of images together to create the second panoramic image.

In another embodiment, a method of producing panoramic images onboard a UAV is provided. The method includes capturing a first set of images of a scene using navigational cameras onboard a UAV, wherein each one of the first set of images corresponds to a different one of the navigational cameras, stitching the first set of images together to create a first panoramic image of the scene, identifying a flight plan for capturing a second set of images with which to create a second panoramic image of the scene using a gimbal camera onboard the UAV, while executing the flight plan, capturing the second set of images of the scene using the gimbal camera, and stitching the second set of images together to create the second panoramic image.

In yet another embodiment, a computing apparatus can provide for panoramic imaging capture for a UAV. The computing apparatus includes one or more computer-readable storage media and program instructions stored on the one or more computer-readable storage media that, based on being read and executed by a processing system, directs the UAV to perform various functions. For example, the program instructions may direct the UAV to capture a first set of images of a scene using navigational cameras onboard the UAV, stitch the first set of images together to create a first panoramic image of the scene, identify a flight plan for capturing a second set of images with which to create a second panoramic image of the scene using a gimbal camera onboard the UAV, capture the second set of images of the scene using the gimbal camera while executing the flight plan, and stitch the second set of images together to create the second panoramic image.

Advantageously, the UAV and imaging techniques described herein provide improvements to imaging and navigational systems, devices, and protocols currently employed. For example, a UAV can iteratively preview types of panoramic images using real-time or previously-captured visual data from navigational cameras during ordinary flight patterns. Thus, an operator of the UAV can view what a panoramic image of a scene outside the UAV would look like if captured by a high-quality gimbal camera before maneuvers are taken to fly an image-specific flight pattern to re-position the UAV for capture of a desired panoramic image using the gimbal camera. The UAV can thus limit the number of maneuvers required before capturing a desired panoramic image as previews of images may be generated using multiple wide-angle navigational cameras with minimal movement of the UAV.

Turning now to the Figures, FIG. 1 illustrates an exemplary operating architecture 100 of an unmanned aerial vehicle (UAV) in which some embodiments of the present technology may be utilized. Operating architecture 100 includes UAV 101 and controller 130. UAV 101 comprises a body, image system 105, a propulsion system 110, flight control system 115, and a transmitter 120 directed to communicate with controller 130. UAV 101 is illustrated with respect to rotation terminology references including roll 102 which indicates a degree of rotation about the X axis, pitch 103, which indicates a degree of rotation about the Y axis, and yaw 103, which indicates a degree of rotation about the Z axis.

Image system 105 includes several navigational cameras, such as navigational cameras 106-1, 106-2, and 106-3 (collectively referred to as navigational cameras 106) and a primary camera, such as gimbal camera 107, onboard the body of UAV 101. As illustrated in operating architecture 100, navigational cameras 106 may be located on a top side of the body of UAV 101. In various embodiments, additional navigational cameras may be located on a bottom side of the body of UAV 101. For example, three additional navigational cameras may be arranged on locations on the bottom of UAV 101 (not shown). Gimbal camera 107 may be located on a front side of the body of UAV 101.

In various examples, navigational cameras 106 may include wide-angle cameras capable of capturing image and video data with a 360-degree view. Accordingly, navigational cameras 106 can capture data above, below, and around UAV 101. Gimbal camera 107 may include a high-resolution camera capable of rotating around 2- or 3-axes. In operation, navigational cameras 106 may be used to provide image and video data for navigational and operational purposes, while gimbal camera 107 may be used to provide image and video data for higher quality visual purposes.

The image and video data from navigational cameras 106 and gimbal camera 107 may be stored in a memory onboard UAV 101 (not shown) (e.g., a non-transitory, computer-readable storage medium), transmitted to a memory external to UAV 101 (not shown) via transmitter 120, and/or transmitted to flight control system 115 for navigational and operational purposes. It follows that image system 105 may be coupled with flight control system 115 and configured to provide images, videos, and other related data to flight control system 115.

Flight control system 115 may be coupled with image system 105, propulsion system 110, and transmitter 120. Flight control system 115 may include one or more processors (e.g., a central processing unit (CPU)) configured to direct flight operations and imaging/video operations of UAV 101, among other operations, via propulsion system 110 and image system 105, respectively. For example, flight control system 115 may execute process 200 of FIG. 2.

In various examples, UAV 101 may include several directional antennas onboard the body of UAV 101. The antennas may be internal to the frame of UAV 101, external to the frame, or some combination thereof. Flight control system 115 may operate in remote communication with controller 130 via the antennas to direct such operations of UAV 101. For example, flight control system 115 may operate in a receive mode whereby flight control system 115 receives signals from controller 130 via a wireless communication link, such as a Wi-Fi network or a Bluetooth link. The signals may indicate a movement command (e.g., a rotation about one or more of the axes, a thrust in a forward or backwards direction, a propel in an upwards or downwards direction), an image or video capture, or some other type of command. Flight control system 115 may direct propulsion system 110 to maneuver UAV 101 according to the movement commands from controller 130 or image system 105 to capture visual data from a scene according to the capture commands from controller 130.

Propulsion system 110 may include several propellors (e.g., propellor 111-1), motors, a propellor control system, rotor assemblies and rotor arms coupled to the body of UAV 101, and the like. As propulsion system 110 drives UAV 101 pursuant to commands from flight control system 115, the position and orientation of UAV 101 about a three-dimensional space can change as guided by flight control system 115 via controller 130.

Flight control system 115 may also operate in a transmit mode whereby flight control system 115 provides signals to controller 130 via the antennas and transmitter 120. Such signals may include information about UAV 101's position and orientation, image or video capture data, and sensor data, such as accelerometer data, gyroscope data, global positioning system data, battery data, propulsion system 110 data, and the like. Flight control system 115 may provide this information to controller 130 via transmitter 120 over the established communication network.

In some implementations, controller 130 includes a mobile phone, tablet, or other computer running software configured to communicate with and control UAV 101, or some other remote receiver. In other embodiments, controller 130 can be a stationary ground station or docking station comprising multiple antennas used to communicate with UAV 101. Controller 130 may include a user interface (e.g., UI 405 of FIGS. 4A, 4B, 4C). Inputs made to the user interface may be communicated as signals, such as the movement signals or image capture signals, to flight system 115.

During live-flight operations of UAV 101, a user, via controller 130, may request capture of a panoramic image of a scene (e.g., a landscape, objects, buildings, structures) around UAV 101. The request may indicate a type of panoramic image, such as a 360-degree panoramic image, a 180-degree vertical panoramic image, or a 180-degree horizontal panoramic image. Flight control system 115 may direct navigational cameras 106 of image system 105 to capture a first set of images of the scene. Any one or more of navigational cameras 106, including cameras located on the bottom side of UAV 101 (not shown in operating architecture 101), may capture one or more images of the scene while in the air. UAV 101 may be stationary while the images are captured, however, in some embodiments, UAV 101 may be moving or rotating about one or more of the axes while the images are captured. Flight control system 115 may direct propulsion system 110 to perform one or more maneuvers to capture the images based on the type of panoramic image requested.

Following the capture of the first set of images of the scene, image system 105 may stitch the first set of images together to create a first panoramic image of the scene. This may entail performing one or more image processing algorithms, such as image stitching, object detection, blending, and distortion correction algorithms, among other types of image and pixel processing techniques. To do so, image system 105 may capture information associated with each image captured by each navigational camera, such as a position of the camera, an orientation of the camera relative to the scene, a time of image capture, and the like. Image system 105 may provide the first panoramic image of the scene to controller 130 via transmitter 120 for display on a user interface of controller 130. In various examples, the first panoramic image of the scene may be presented as a "preview" of a high-resolution panoramic image that may be capturable by gimbal camera 107. Advantageously, using the navigational cameras 106 to capture a first panoramic image as a preview may conserve power of UAV 101 by using lower resolution navigational cameras prior to committing to perform various maneuvers to capture a panoramic image of the scene using gimbal camera 107.

Next, a user may request capture of the previewed panoramic image via the user interface of controller 130. Controller 130 may provide a signal to UAV 101, and in response to receiving the signal, flight control system 115 can identify a flight plan for capturing a second set of images with which to create a second panoramic image (i.e., a higher quality panoramic image relative to the first panoramic image) using gimbal camera 107. Flight control system 115 may identify the flight plan based, at least in part, on the information captured by image system 105 during capture of the first set of images, such as the position and orientation data. For example, flight system 115 may determine one or more new positions and orientations for UAV 101 from which to capture the second set of images. The flight plan may include one or more maneuvers executable by propulsion system 110 for UAV 101 to reach the one or more new positions and orientations and capture new images. Flight system 115 can direct propulsion system 110 to make one or more maneuvers based on the flight plan to reach the new positions, and while executing the flight plan, flight system 115 can direct image system 105 to capture the second set of images of the scene using gimbal camera 107. The gimbal camera 107 may capture one or more images of the scene from the same perspective as captured by navigational cameras 106. It follows that due to the location of navigational cameras 106 on UAV, gimbal camera 107 may capture the second set of images from a different geographical and spatial position and a different orientation relative to the scene.

Following the capture of the second set of images using gimbal camera 107, image system 105 may stitch the second set of images together to create the second panoramic image. As mentioned above, this may entail performing one or more image processing algorithms, such as image stitching, object detection, blending, and distortion correction algorithms, among other types of image and pixel processing techniques. After processing the image data and creating the second panoramic image, image system 105 may provide the second panoramic image to controller 130 via transmitter 120 for display on the user interface of controller 130.

Figure 2:
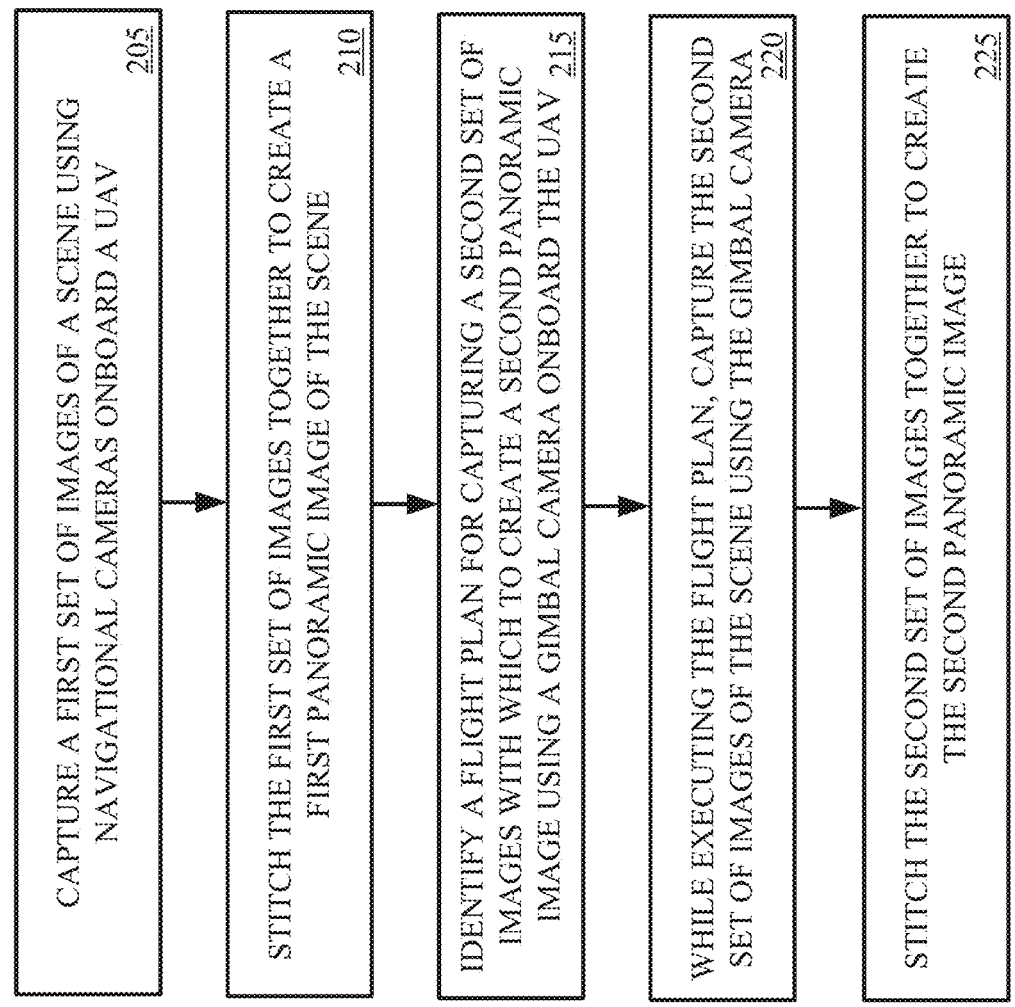
FIG. 2 is a flowchart illustrating an exemplary process for capturing panoramic images from an unmanned aerial vehicle in accordance with some embodiments of the present technology.

FIG. 2 is a flowchart illustrating an exemplary process for capturing panoramic images using cameras on an unmanned aerial vehicle (UAV). FIG. 2 includes process 200, which references elements of operating architecture 100 of FIG. 1. Process 200 includes various steps to capture panoramic images using different cameras of a UAV, such as UAV 101, based a UAV's position and orientation about a space. In various examples, process 200 can be implemented in hardware, software, firmware, or any combination or variation thereof. For example, process 200 may be implemented in one or more components of UAV 101 of FIG. 1 and UAV 310 of FIGS. 3A and 3B.

In operation 205, image system 105 of UAV 101 captures a first set of images of a scene using navigational cameras 106 onboard UAV 101. Image system 105 may include several navigational cameras, such as navigational cameras 106-1, 106-2, and 106-3 (collectively referred to as navigational cameras 106) and a primary camera, such as gimbal camera 107, onboard the body of UAV 101. Three navigational cameras 106 may be located on a top side of the body of UAV 101, and three additional navigational cameras 106 may be located on a bottom side of the body of UAV 101. Gimbal camera 107 may be located on a front side of the body of UAV 101.

In various examples, navigational cameras 106 may include wide-angle cameras capable of capturing image and video data with a 360-degree view. Accordingly, navigational cameras 106 can capture data above, below, and around UAV 101. Gimbal camera 107 may include a high-resolution camera capable of rotating around 2- or 3-axes. In operation, navigational cameras 106 may be used to provide image and video data for navigational and operational purposes, while gimbal camera 107 may be used to provide image and video data for higher quality visual purposes.

Image system 105 may be configured to capture the first set of images in response to a request from controller 130 (e.g., a UAV docking station, a mobile device, a tablet, or any other computing device). Controller 130 may communicate with UAV 101 via transmitter 120 over a communication network. Flight control system 115, coupled to receive signals from controller 130 via transmitter 120, may be further coupled to provide instructions to components of UAV 101 based on the signals from controller 130. For example, flight control system 115 may be coupled to image system 105 and propulsion system 110 of UAV and can direct operations thereof based on instructions from controller 130. In this example, flight control system 115 can direct image system 105 to capture the first set of images of the scene using navigational cameras 106.

In operation 210, image system 105 can stitch the first set of images together to create a first panoramic image of the scene. This may entail performing one or more image processing algorithms, such as image stitching, object detection, blending, and distortion correction algorithms, among other types of image and pixel processing techniques. To do so, image system 105 may capture information associated with each image captured by each navigational camera, such as a position of the camera, an orientation of the camera relative to the scene, a time of image capture, and the like. Image system 105 may provide the first panoramic image of the scene to controller 130 via transmitter 120 for display on a user interface of controller 130. In various examples, the first panoramic image of the scene may be presented as a "preview" of a high-resolution panoramic image that may be capturable by gimbal camera 107.

Advantageously, using the navigational cameras 106 to capture a first panoramic image as a preview may conserve power of UAV 101 by using lower resolution navigational cameras prior to committing to perform various maneuvers to capture a panoramic image of the scene using gimbal camera 107.

In operation 215, flight control system 115 identifies a flight plan for capturing a second set of images with which to create a second panoramic image using gimbal camera 107 onboard UAV 101. In various examples, flight control system 115 identifies the flight plan in response to a request from controller 130. For example, a user may request capture of the previewed panoramic image via the user interface of controller 130. Controller 130 may provide a signal to UAV 101, and in response to receiving the signal, flight control system 115 can identify the flight plan for capturing a second set of images with which to create a second panoramic image (i.e., a higher quality panoramic image relative to the first panoramic image) using gimbal camera 107. Flight control system 115 may identify the flight plan based, at least in part, on the information captured by image system 105 during capture of the first set of images, such as the position and orientation data. For example, flight system 115 may determine one or more new positions and orientations for UAV 101 from which to capture the second set of images. The flight plan may include one or more maneuvers executable by propulsion system 110 for UAV 101 to reach the one or more new positions and orientations and capture new images.

In operation 220, flight system 115 can direct propulsion system 110 to maneuver to a new position based on the flight plan, and while executing the flight plan, flight system 115 can direct image system 105 to capture the second set of images of the scene using gimbal camera 107. The gimbal camera 107 may capture one or more images of the scene from the same perspective as captured by navigational cameras 106. It follows that due to the location of navigational cameras 106 on UAV, gimbal camera 107 may capture the second set of images from a different geographical and spatial position and a different orientation relative to the scene.

In operation 225, following the capture of the second set of images using gimbal camera 107, image system 105 may stitch the second set of images together to create the second panoramic image. As in operation 210, this may entail performing one or more image processing algorithms, such as image stitching, object detection, blending, and distortion correction algorithms, among other types of image and pixel processing techniques. After processing the image data and creating the second panoramic image, image system 105 may provide the second panoramic image to controller 130 via transmitter 120 for display on the user interface of controller 130.

Figure 3A:
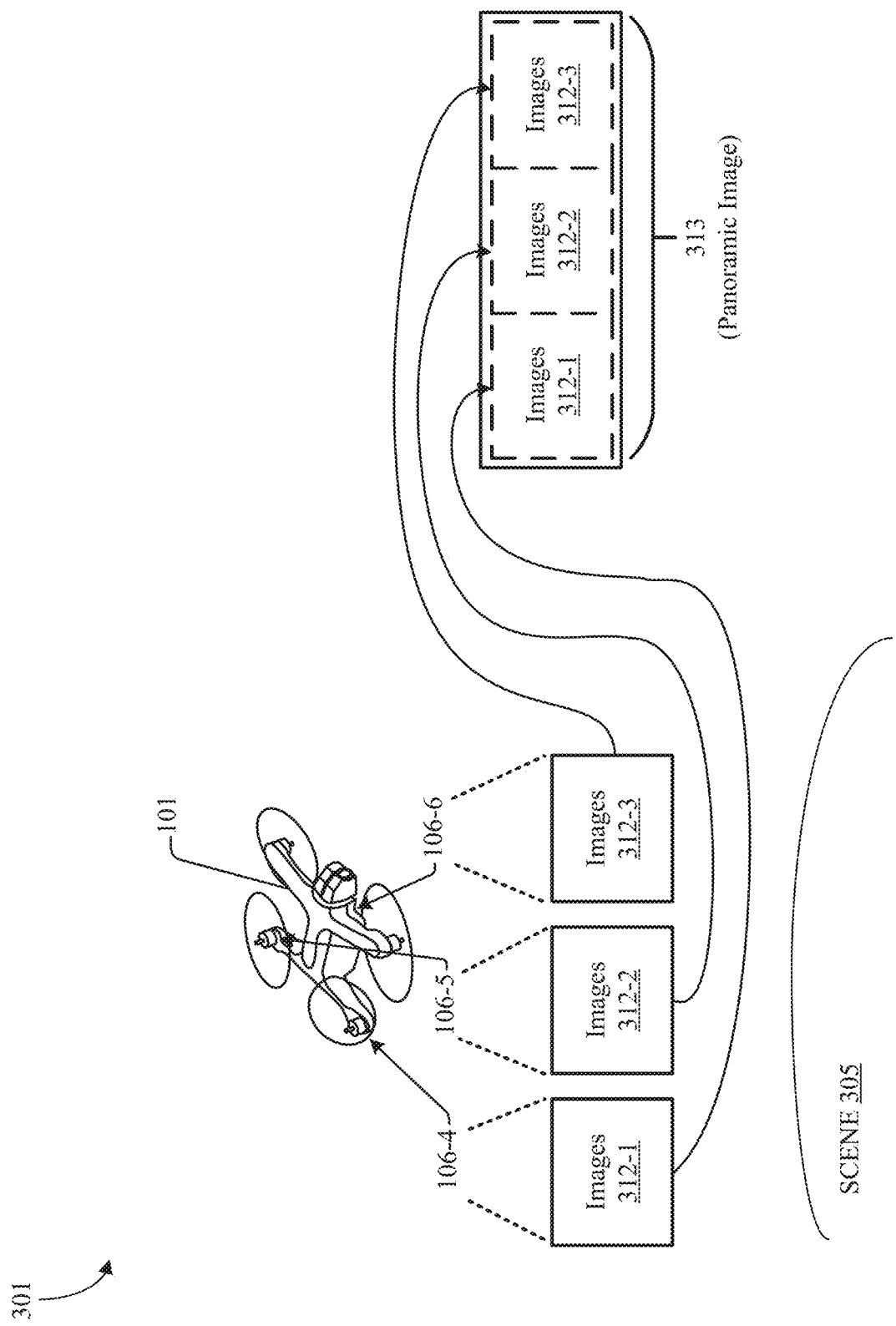
FIGS. 3A and 3B illustrate exemplary operating environments using navigational cameras and a gimbal camera on an unmanned aerial vehicle, respectively, in accordance with some embodiments of the present technology.
Figure 3B:
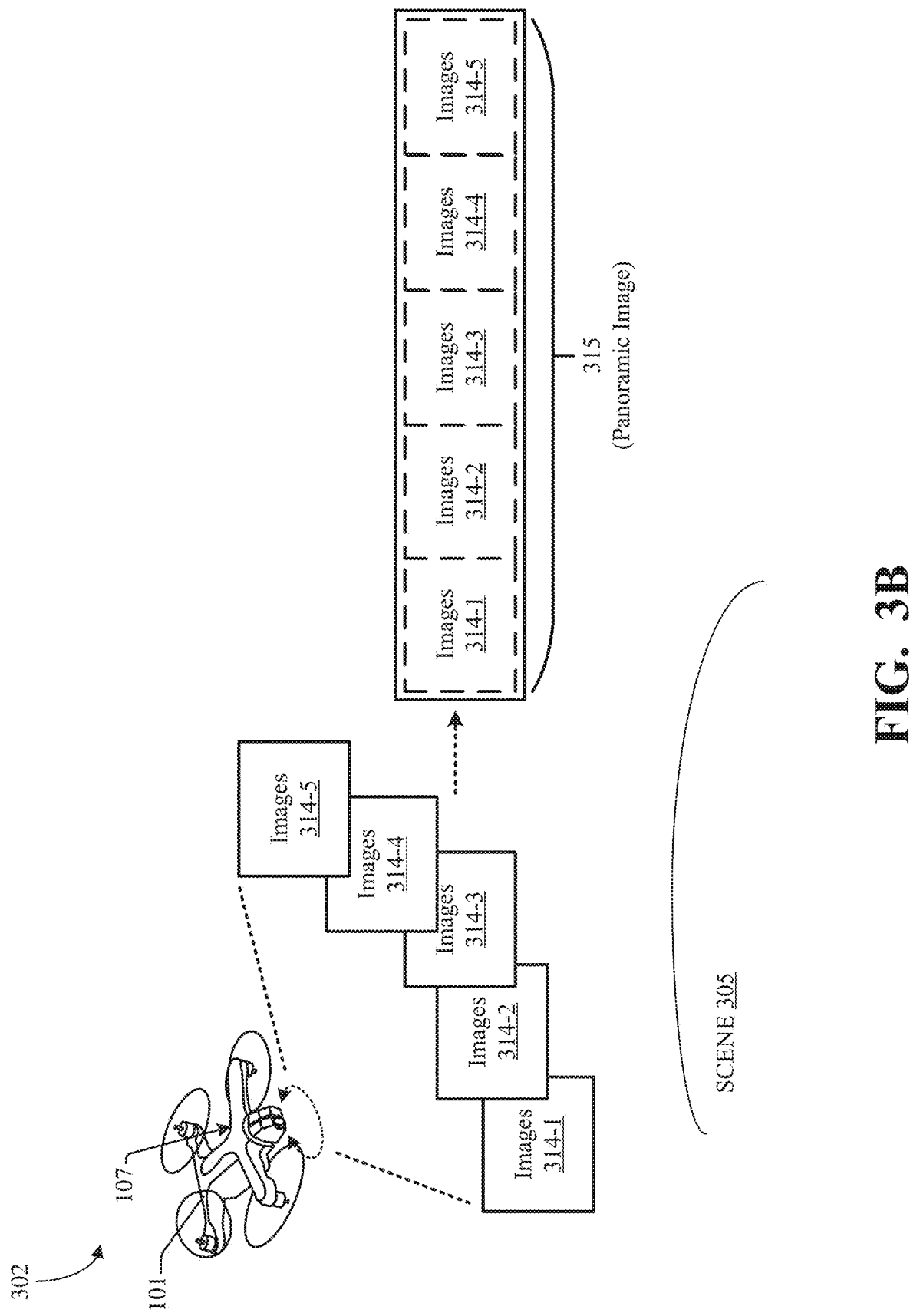

FIGS. 3A and 3B illustrate exemplary operating environments using navigational cameras and a gimbal camera on an unmanned aerial vehicle, respectively, in accordance with some embodiments of the present technology. FIG. 3A includes operating environment 301, which includes UAV 101 and navigational cameras 106-4, 106-5, and 106-6 located on a bottom side of the body of UAV 101. FIG. 3B includes operating environment 302, which includes UAV 101 and gimbal camera 107.

UAV 101 of operating environments 301 and 302 is representative of a drone that includes a body, propellors, antennas, and several cameras, such as navigational cameras 106-4, 106-5, and 106-6 (collectively referred to as navigational cameras 106) and gimbal camera 107, among other components. The navigational cameras included in operating environment 301 may be positionally-fixed, wide-angle, 360-degree view cameras located on the bottom side of the body of UAV 101 and may be configured to capture sets of images (e.g., images 312-1, 312-2, and 312-3 (collectively images 312)) of a scene 305 below UAV 101. The gimbal camera 107 included in operating environment 302 may be located on a front side of the body of UAV and may be configured to swivel, rotate, and otherwise gyrate to capture different sets of images (e.g., images 314-1, 314-2, 314-3, 314-4, and 314-5 (collectively images 314)) of scene 305 below UAV 101.

Referring first to operating environment 301, UAV 101 may be flying above scene 305 in a first position and orientation. Scene 305 may include a landscape, one or more buildings or other structures, and the like. While in live-flight, UAV 101 may use navigational cameras 106 to capture a first set of images, images 312, of scene 305 from the first position and orientation. More specifically, images 312-1 may include one or more images of scene 305 captured by navigational camera 106-4, which may be located on the bottom side of UAV 101 underneath a back-right propellor of UAV 101 with respect to a front-side of UAV 101 where gimbal camera 107 (not shown in operating environment 301) is located. Images 312-2 may include one or more images of scene 305 captured by navigational camera 106-5, which may be located on the bottom side of UAV 101 underneath a back-left propellor of UAV 101 with respect to a front-side of UAV 101. Images 312-3 may include one or more images of scene 305 captured by navigational camera 106-6, which may be located on the bottom side of UAV 101 near the middle of the body of UAV 101. Accordingly, images 312 may be captured from three different perspectives and viewpoints based on the locations of navigational cameras 106 onboard UAV 101. In some cases, one or more of images 312 may overlap with each other based on the positioning of navigational cameras 106, the distance between UAV 101 and scene 305, and other factors.

An image system onboard UAV, such as image system 105 of FIG. 1, may stitch images 312 together by performing one or more image processing algorithms on images 312. For example, the image system may perform algorithms related to image stitching, object detection, image blending, distortion correction, pixel correction, and the like to form panoramic image 313 from images 312. In an example, such as one illustrated by operating environment 301, images 312-1 may include images capturing a left-most portion of scene 305, images 312-2 may include images capturing a middle portion of scene 305, and images 312-3 may include images capturing a right-most portion of scene 305 based on the locations of navigational cameras 106 on UAV 101. Thus, the image system may blend together images 312-1, 312-2, and 312-3 from left to right to form panoramic image 313 of scene 305.

In various examples, panoramic image 313 is a first panoramic image of the scene that may be presented as a "preview" taken with navigational cameras 106 that may be replicated in a higher quality by using gimbal camera 107. Advantageously, using the navigational cameras 106 to capture a first panoramic image as a preview may conserve power of UAV 101 by using lower resolution navigational cameras prior to committing to perform various maneuvers to capture a panoramic image of the scene using gimbal camera 107.

Referring next to operating environment 302, UAV 101 may fly to a new position from the previous position shown in operating environment 301 such that UAV 101 can capture images 314 of scene 305 using gimbal camera 107 to create panoramic image 315. UAV 101 may fly to the new position based on a flight plan identified by a flight control system (e.g., flight control system 115 of FIG. 1) and flown by a propulsion system (e.g., propulsion system 110 of FIG. 1) of UAV 101 as directed by the flight control system. The flight control system may identify the flight plan, based at least in part, on information captured by the image system while capturing images 312 via navigational cameras 106 in operating environment 301. For example, such information may include information associated with each image captured by each navigational camera, such as a position of the camera, an orientation of the camera relative to the scene, a time of image capture, and the like. The flight system may determine one or more new positions and orientations for UAV 101, such as the position shown in operating environment 302, from which to capture images 314 of scene 305. The flight plan may include one or more maneuvers executable by the propulsion system of UAV 101 to reach the new position and orientation.

At the new position and orientation, UAV 101 can use gimbal camera 107 to capture images 314 of scene 305. More specifically, gimbal camera 107 may capture images 314-1, 314-2, 314-3, 314-4, and 314-5 from left-to-right relative to a perspective from the ground looking at scene 305. Like images 312 captured by navigational cameras 106, one or more images of images 314 may overlap and capture the same objects or parts of a landscape, for example. The image system onboard UAV may stitch images 314 together by performing one or more image processing algorithms on images 314. For example, the image system may perform algorithms related to image stitching, object detection, image blending, distortion correction, pixel correction, and the like to form panoramic image 315 from images 314. The image system may blend together images 314-1, 314-2, 314-3, 314-4, and 313-5 from left to right to form panoramic image 315. In various examples, panoramic image 315 and panoramic image 313 are identical, or nearly identical, to each other with respect to subject matter. However, panoramic image 315 may be a higher quality and resolution image of scene 305 relative to panoramic image 313 due to the quality of gimbal camera 107.

Figure 4A:
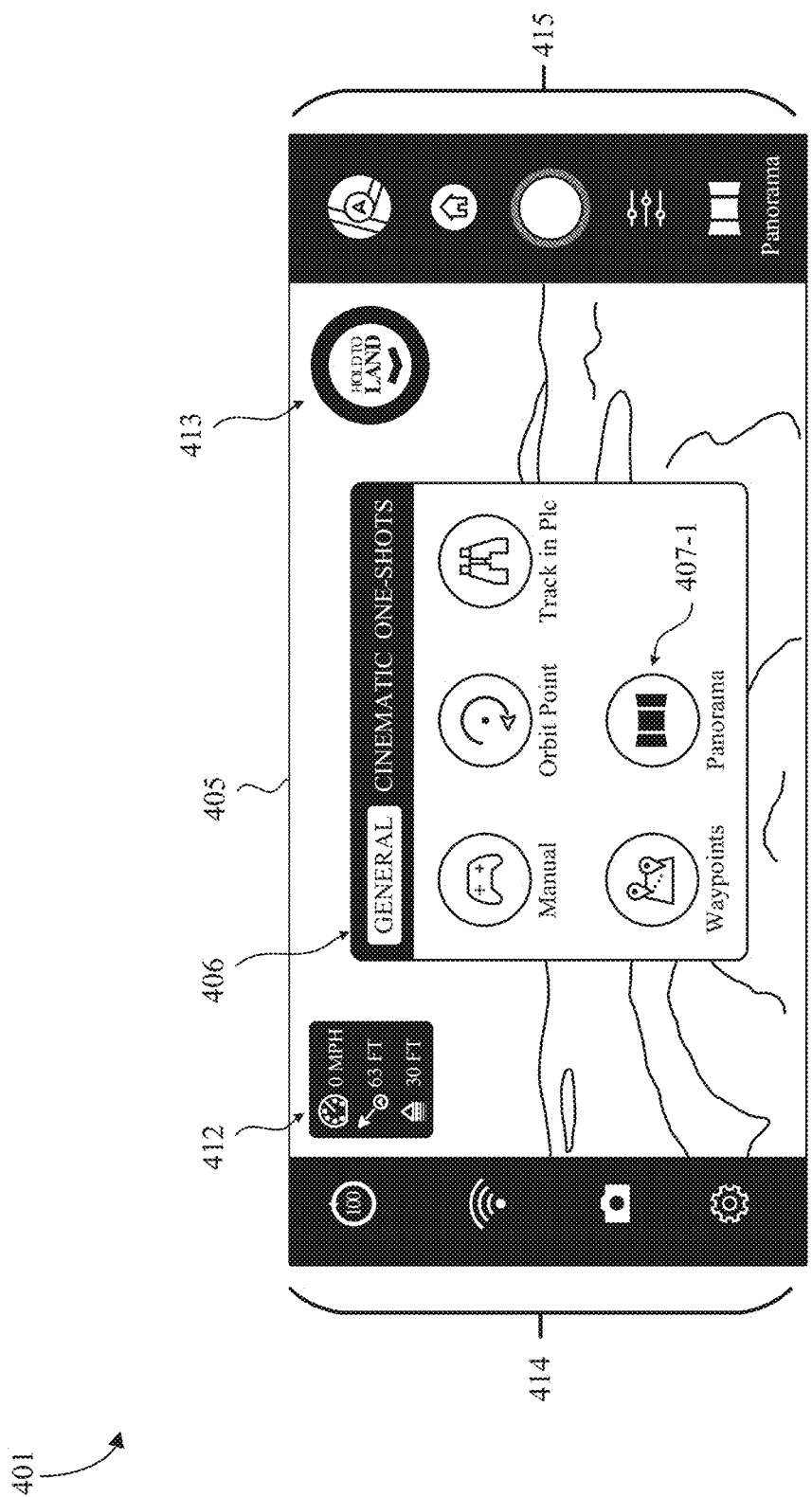
FIGS. 4A, 4B, and 4C illustrate example aspects of an exemplary user interface in accordance with some embodiments of the present technology.
Figure 4B:
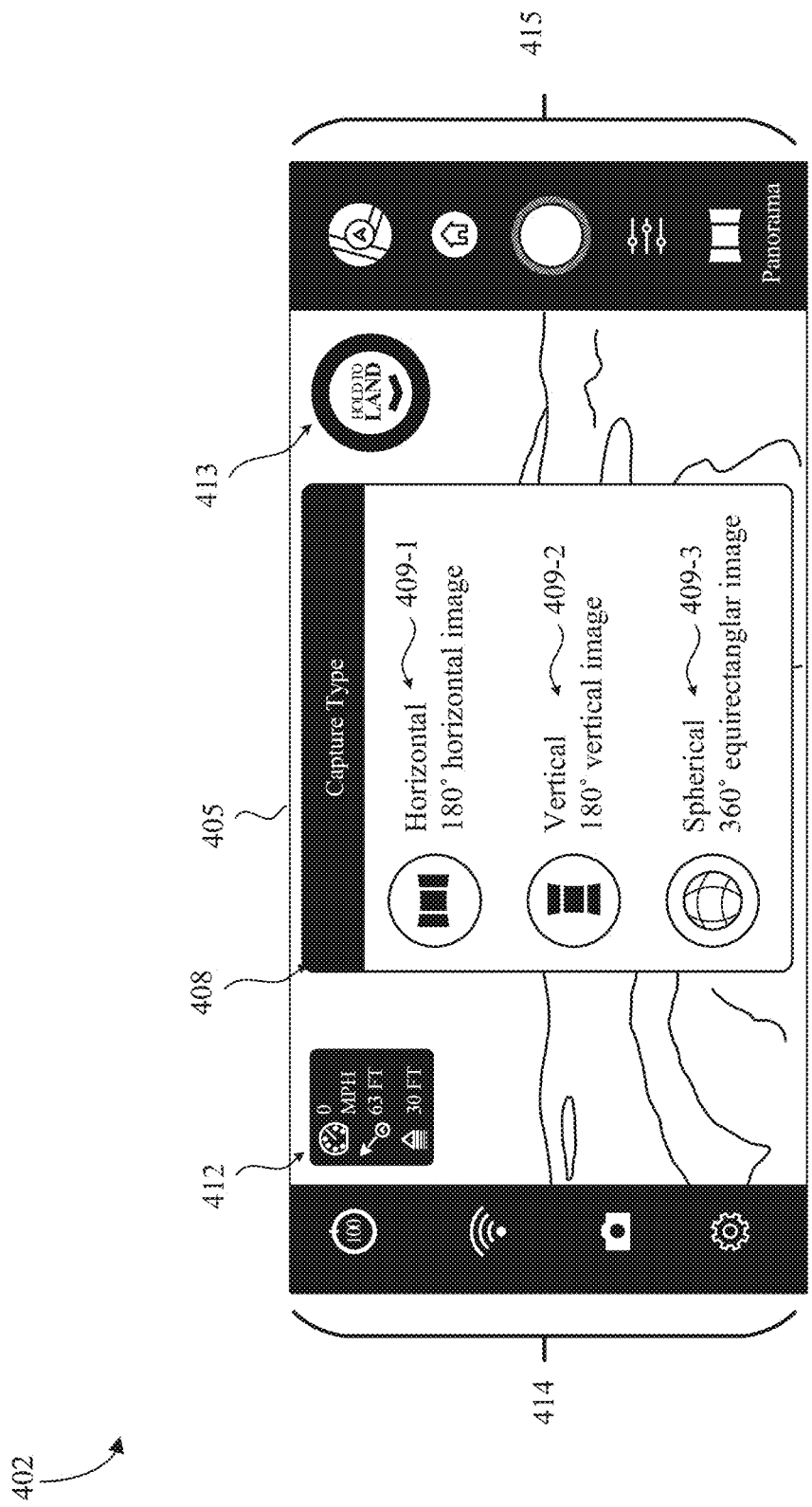
Figure 4C:
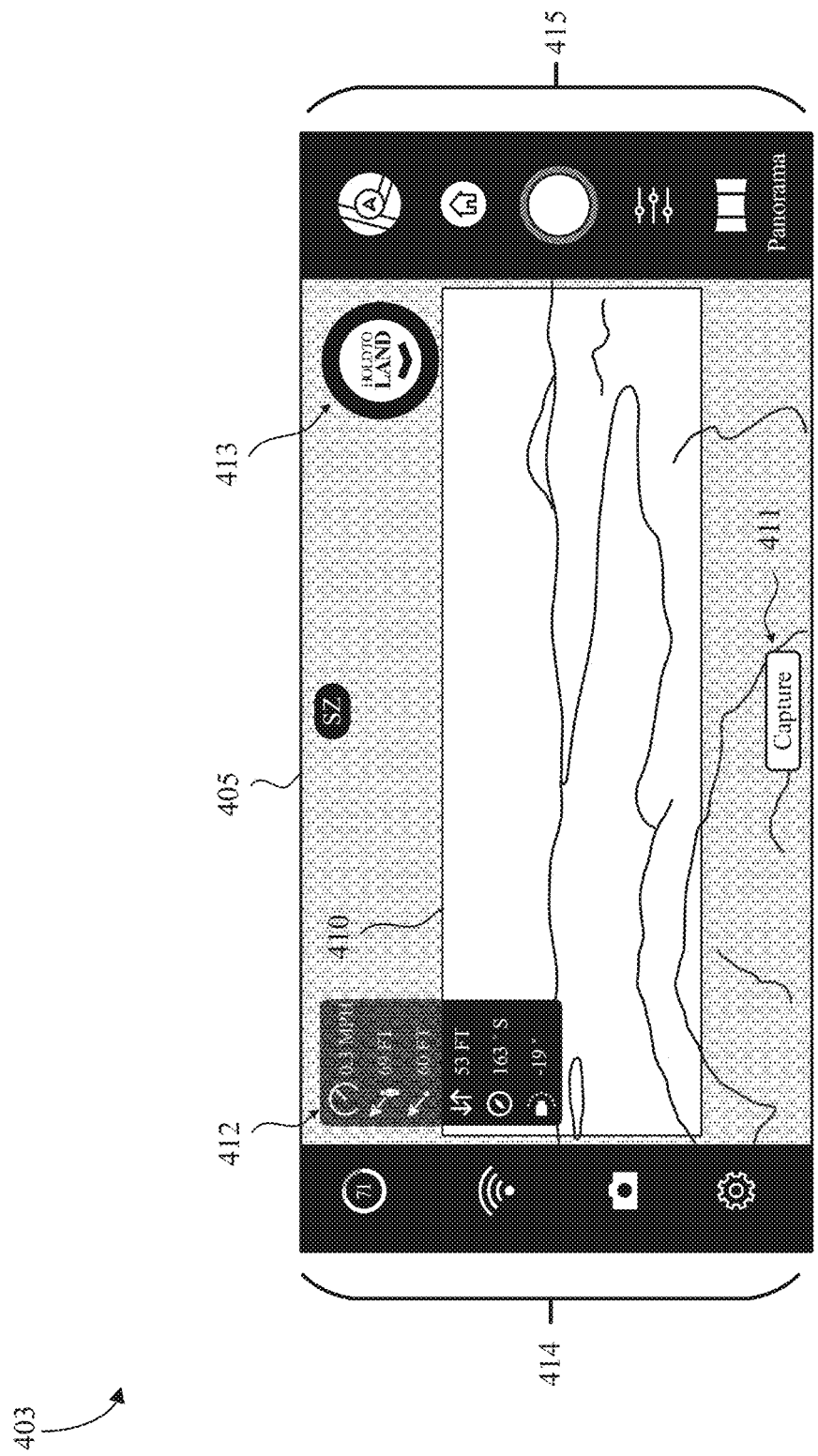

FIGS. 4A, 4B, and 4C illustrate example aspects of an exemplary user interface in accordance with some embodiments of the present technology. FIGS. 4A, 4B, and 4C illustrate aspects 401, 402, and 403, respectively, of user interface (UI) 405. UI 405 may include various visual elements and menus that, when interacted with, may provide functionality associated with an unmanned aerial vehicle (UAV) (e.g., UAV 101 of FIG. 1) or display indications related to such functionality. For example, UI 405 may include visual representations, status indications, and interaction options, among other things, associated with the UAV. UI 405 may be included and displayed on a controller operatively coupled with a UAV, such as controller 130 and UAV 101 of FIG. 1.

Referring first to aspect 401 of FIG. 4A, aspect 401 includes a first illustration of UI 405 that includes menu 406, operations indications 412, landing operation control 413, status bar 414, and widget bar 415. A user may interact with each of menu 406, operations indications 412, landing operation control 413, status bar 414, and widget bar 415, and elements thereof, by way of a touch, a tap, a click, or some other type of interaction. Following an interaction with one of the elements displayed on UI 405, a different visual representation than one shown in aspect 401 may be displayed, such as one of the illustrations of aspects 402 or 403.

As illustrated in aspect 401, menu 406 includes one or more options to view image or video data captured by a UAV, such as panorama mode 407-1, control flight operations of the UAV, control and/or view navigation operations of the UAV, and the like. Operations indications 412 may include one or more indications related to the operations and flight of the UAV, such as a speed of the UAV, an altitude of the UAV, an orientation or position of the UAV, and the like. Landing operation control 413 may include functionality to perform a landing operation of the UAV. Status bar 414 may include indications related to status of the UAV, such as battery life remaining, connection status (i.e., to a wireless communication network), and other settings. Widget bar 415 may include icons related to additional functionality, such as image capture functionality, navigation functionality, and other functionality. The locations of each icon and indication may vary from implementation to implementation. Further, additional or fewer icons and functionality may be displayed on UI 405.

Panorama mode 407-1 is an option displayed in menu 406 related to capturing and viewing panoramic images from the UAV during live-flight of the UAV. Panorama mode 407-1 may be represented by an icon with the description "Panorama," which may be pressed, pushed, tapped, touched, clicked, or otherwise interacted with on menu 406 of UI 405. Following an interaction with the icon representative of panorama mode 407-1, UI 405 may display a different set of visual elements in place or in addition to menu 406, among other visual elements, such as panorama mode menu 408 of aspect 402.

Referring next to aspect 402 of FIG. 4B, aspect 402 includes a second illustration of UI 405 that includes panorama mode menu 408, operations indications 412, landing operation control 413, status bar 414, and widget bar 415. Panorama mode menu 408 may be displayed on UI 405 following a user interaction with panorama mode 407-1 on menu 406 of aspect 401.

As illustrated in aspect 402, panorama mode menu 408 may include options for capturing different types of panoramic images using cameras onboard the UAV. The options may include horizontal panoramic image 409-1, vertical panoramic image 409-2, and spherical panoramic image 409-3. Horizontal panoramic image 409-1 may refer to a 180-degree horizontal panoramic image (e.g., a vertically-centered at the horizon 180-degree landscape view with a 1:4 aspect ratio 36 MP photo). Vertical panoramic image 409-2 may refer to a 180-degree vertical panoramic image (e.g., a 180-degree view in front of the UAV with a 1:3 aspect ratio 30 MP photo). Spherical panoramic image 409-3 may refer to a 360-degree equirectangular panoramic image (e.g., a 72 MP photo viewable in 360-degrees around a scene). Each of horizontal panoramic image 409-1, vertical panoramic image 409-2, and spherical panoramic image 409-3 may be captured using either one or more navigational cameras onboard the UAV (e.g., navigational cameras 106 of FIG. 1) or a gimbal camera onboard the UAV (e.g., gimbal camera 107 of FIG. 1).

After selecting one of horizontal panoramic image 409-1, vertical panoramic image 409-2, and spherical panoramic image 409-3 for capturing a panoramic image, UI 405 may display a different set of visual elements like a screen displaying image data for capture of the selected image type, such as image preview 410 of aspect 403. In some embodiments, after selecting one of the options for capturing the panoramic image, a toggle may be available (i.e., selectable on UI 405 or automatically enabled) that locks exposure value properties (e.g., shutter speed, ISO) related to the capture of images from the moment the UAV captures the images to the moment the UAV finishes capturing the images.

Referring next to aspect 403 of FIG. 4C, aspect 403 includes a third illustration of UI 405 that includes image preview 410, operations indications 412, landing operation control 413, status bar 414, and widget bar 415. Image preview 410 may be displayed on UI 405 following a user interaction with panorama mode 407-1 on menu 406 of aspect 401 then a second user interaction with panorama mode menu 408 of aspect 402.

As illustrated in aspect 403, image preview 410 may include a frame including image data from cameras onboard the UAV. The shape of the frame of image preview 410 may be determined based on the selection of a type of panoramic image on panorama mode menu 408. For example, the frame may be of a horizontal rectangular shape if horizontal panoramic image 409-1 is selected, the frame may be of a vertical rectangular shape if vertical panoramic image 409-2 is selected, and the frame may be horizontal shape if spherical panoramic image 409-3 is selected. In aspect 403, image preview 410 may display image data in a horizontal rectangular shape to demonstrate a preview of horizontal panoramic image 409-1.

In various examples, the image data displayed in image preview 410 of UI 405 may be streamed or transmitted to a controller for display on image preview 410 of UI 405 in real-time. For example, image preview 410 may be a fly screen showing a portion of real-time data captured by the navigational cameras of the UAV. Despite being able to capture 360-degree views from the UAV using the navigational cameras, only a select 180-degree view of what the frame of the main gimbal UAV camera could see from the UAV's current perspective may be shown based on the type of panoramic image selected in aspect 402. In other examples, the image data displayed on image preview 410 may be identified and obtained from a memory of the UAV and provided to the controller for display on UI 405. Regardless, the image data displayed in image preview 410 may be image data captured by navigational cameras onboard the UAV. Thus, the image data may be low-resolution image data, or lower-resolution than image data capturable by a gimbal camera onboard the UAV.

A user may "capture" the panoramic image, including the image data displayed in image preview 410 by interacting with capture button 411 on UI 405. In other examples, the user may instead capture the panoramic image using a button (e.g., a hardware shutter button) on a handheld controller associated with the UAV (not shown) (e.g., controller 130) separate from or coupled to UI 405. Following a click, tap, or other interaction with capture button 411, the UAV may perform a panoramic capture process (e.g., process 200 of FIG. 2) whereby the UAV captures high-resolution image data of the same type of panoramic image and of the same subject matter as the data shown in image preview 410 using a gimbal camera as opposed to the navigational cameras. For example, following a capture of a panoramic image using capture button 411 in aspect 403, the UAV may identify information about the image data, such as which navigational cameras were used to obtain the image data, the location and position of the navigational camera(s)

relative to the scene being captured, and the like. Based on this information, the UAV can identify a flight plan including one or more maneuvers to re-position the UAV to capture the scene using the gimbal camera. Following the maneuvers, the UAV can capture high-resolution image data mimicking the image data displayed in image preview 410 and transmit a high-resolution panoramic image to the controller for display on UI 405.

In some embodiments, during the panoramic image capture, a user may not be able to maneuver the UAV until the capture process is complete or unless the user interrupts the capture process. To interrupt the capture process, a user may press, click, or tap a button or icon on UI 405 (not shown) or on a controller associated with the UAV to abort the capture process and allow the user to resume manual flight operations of the UAV. After completion of the capture process, the UAV may re-position itself to an original position and orientation the UAV was in prior to capture of the panoramic image. In any case, a user may have to wait until the panoramic image is stitched and complete for viewing prior to powering down the UAV. The final stitched output panoramic image may be displayed as requested based on the type of panoramic image as in FIG. 4B but may also include metadata that allows a user to view and interact with the panoramic image in a 360-degree view in the same window or tab of UI 405, in a different window or tab of UI 405 (e.g., a media tab, a review tab), or in a different display altogether.

Figure 5:
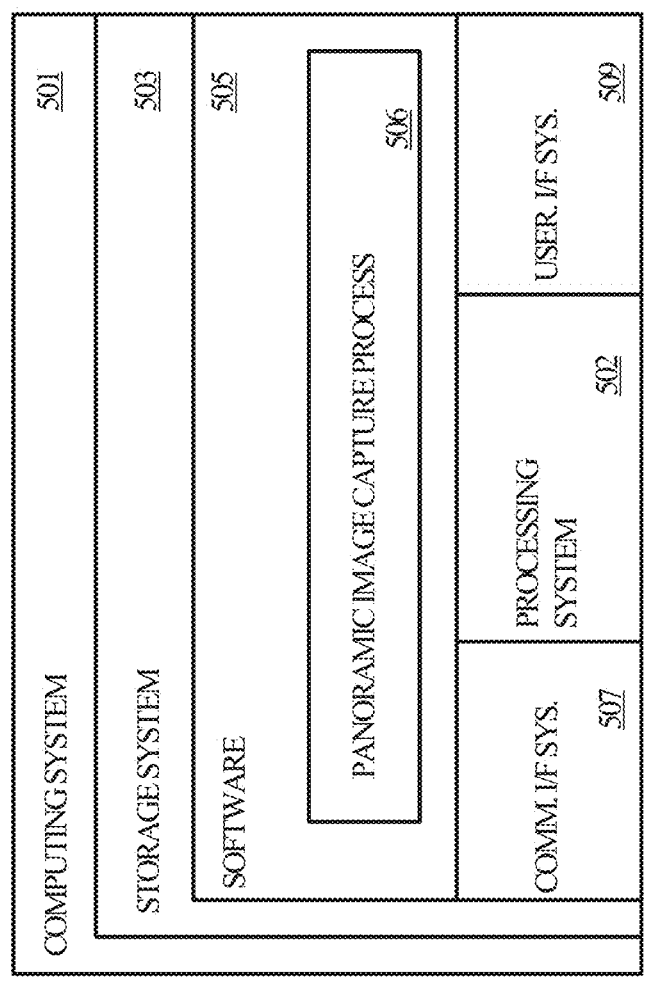
FIG. 5 illustrates an example computing system that may be utilized in some embodiments of the present technology.

FIG. 5 illustrates computing system 501 to perform image capture and panoramic image creation processes via cameras onboard an unmanned aerial vehicle (UAV) according to an implementation of the present technology. Computing system 501 is representative of any system or collection of systems with which the various operational architectures, processes, scenarios, and sequences disclosed herein for panoramic image capture may be employed. Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509 (optional). Processing system 502 is operatively coupled with storage system 503, communication interface system 507, and user interface system 509. Computing system 501 may be representative of a cloud computing device, distributed computing device, or the like.

Processing system 502 loads and executes software 505 from storage system 503. Software 505 includes and implements panoramic image capture process 506, which is representative of any of the image capturing, image blending and processing, UAV maneuvering for image capturing processes discussed with respect to the preceding Figures. When executed by processing system 502 to provide image capture functions, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, graphical processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including panoramic image capture process 506) may be implemented in program instructions and among other functions may, when executed by processing system 502, direct processing system 502 to operate as described with respect to the various operational scenarios, sequences, and processes illustrated herein. For example, software 505 may include program instructions for implementing a panoramic image capture process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to provide image capture and processing as described herein. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

Disclosed herein are implementations of panoramic image capture using an unmanned aerial vehicle (UAV).

In a first aspect, the subject matter described in this specification can be embodied in computing apparatuses that include one or more computer-readable storage media; and program instructions stored on the one or more computer-readable storage media that, based on being read and executed by a processing system, direct an unmanned aerial vehicle (UAV) to at least: capture a first set of images of a scene using navigational cameras onboard the UAV, wherein each one of the first set of images corresponds to a different one of the navigational cameras; stitch the first set of images together to create a first panoramic image of the scene; identify a flight plan for capturing a second set of images with which to create a second panoramic image of the scene using a gimbal camera onboard the UAV; while executing the flight plan, capture the second set of images of the scene using the gimbal camera; and stitch the second set of images together to create the second panoramic image.

In a second aspect, the subject matter described in this specification can be embodied in computing apparatuses of the preceding aspect wherein the program instructions further direct the UAV to display the second panoramic image on a user interface of a controller coupled with the UAV In a third aspect, the subject matter described in this specification can be embodied in computing apparatuses of the preceding aspects, or any combination thereof, wherein to stitch the first set of images together to create the first panoramic image of the scene, the program instructions direct the UAV to perform an image registration algorithm on the first set of images to identify correspondences between two or more of the images of the first set of images and to perform a blending algorithm on the first set of images based on the correspondences.

In a fourth aspect, the subject matter described in this specification can be embodied in computing apparatuses of the preceding aspects, or any combination thereof, wherein the flight plan comprises one or more maneuvers to reposition the UAV to a new position at which to capture one or more of the images of the second set of images.

In a fifth aspect, the subject matter described in this specification can be embodied in computing apparatuses of the preceding aspects, or any combination thereof, wherein, to identify the flight plan, the program instructions direct the UAV to: identify the new position based on a previous position of the UAV associated with the first set of images; and identify the one or more maneuvers to direct the UAV from a current position to the new position.

In a sixth aspect, the subject matter described in this specification can be embodied in computing apparatuses of the preceding aspects, or any combination thereof, wherein to stitch the second set of images together to create the second panoramic image, the program instructions direct the UAV to perform an image registration algorithm on the second set of images to identify correspondences between two or more of the images of the second set of images and to perform a blending algorithm on the second set of images based on the correspondences.

In a seventh aspect, the subject matter described in this specification can be embodied in computing apparatuses of the preceding aspects, or any combination thereof, wherein the second panoramic image is a high resolution version of the first panoramic image, and wherein the first panoramic image and the second panoramic image are one of a 180-degree vertical panoramic image, a 180-degree horizontal panoramic image, and 360-degree panoramic image.

In an eighth aspect, the subject matter described in this specification can be embodied in computing apparatuses of the preceding aspects, or any combination thereof, wherein the navigational cameras comprise three navigational cameras located on a top side of the UAV and three navigational cameras located on a bottom side of the UAV.

In a ninth aspect, the subject matter described in this specification can be embodied in an unmanned aerial vehicle (UAV) that includes a flight control system, a propulsion system operatively coupled with the flight control system and configured to propel the UAV as directed by the flight control system; and an image system comprising navigational cameras and a gimbal camera, wherein the image system is configured to: capture a first set of images of a scene using the navigational cameras, wherein each one of the first set of images corresponds to a different one of the navigational cameras; stitch the first set of images together to create a first panoramic image of the scene; identify a flight plan for capturing a second set of images with which to create a second panoramic image of the scene using the gimbal camera; while executing the flight plan via the propulsion system, capture the second set of images of the scene using the gimbal camera; and stitch the second set of images together to create the second panoramic image.

In a tenth aspect, the subject matter described in this specification can be embodied in the UAV of the preceding aspect, wherein the UAV further includes a transmitter configured to provide the second panoramic image to a controller associated with the UAV.

In an eleventh aspect, the subject matter described in this specification can be embodied in the UAV of the preceding aspects, or any combination thereof, wherein to stitch the first set of images together to create the first panoramic image of the scene, the image system is configured to perform an image registration algorithm on the first set of images to identify correspondences between two or more of the images of the first set of images and to perform a blending algorithm on the first set of images based on the correspondences.

In a twelfth aspect, the subject matter described in this specification can be embodied in the UAV of the preceding aspects, or any combination thereof, wherein the flight plan comprises one or more maneuvers to reposition the UAV to a new position at which to capture one or more of the images of the second set of images, and wherein to identify the flight plan, the image system is configured to identify the new position based on a previous position of the UAV associated with the first set of images and identify the one or more maneuvers to direct the UAV from a current position to the new position.

In a thirteenth aspect, the subject matter described in this specification can be embodied in the UAV of the preceding aspects, or any combination thereof, wherein to stitch the second set of images together to create the second panoramic image, the image system is configured to perform an image registration algorithm on the second set of images to identify correspondences between two or more of the images of the second set of images and to perform a blending algorithm on the second set of images based on the correspondences.

In a fourteenth aspect, the subject matter described in this specification can be embodied in the UAV of the preceding aspects, or any combination thereof, wherein the second panoramic image is a high resolution version of the first panoramic image, and wherein the first panoramic image and the second panoramic image are one of a 180-degree vertical panoramic image, a 180-degree horizontal panoramic image, and 360-degree panoramic image.

In a fifteenth aspect, the subject matter described in this specification can be embodied in the UAV of the preceding aspects, or any combination thereof, wherein the navigational cameras comprise three navigational cameras located on a top side of the UAV and three navigational cameras located on a bottom side of the UAV.

In a sixteenth aspect, the subject matter described in this specification can be embodied in a method of producing panoramic images onboard an unmanned aerial vehicle (UAV), including capturing a first set of images of a scene using navigational cameras onboard a UAV, wherein each one of the first set of images corresponds to a different one of the navigational cameras; stitching the first set of images together to create a first panoramic image of the scene; identifying a flight plan for capturing a second set of images with which to create a second panoramic image of the scene using a gimbal camera onboard the UAV; while executing the flight plan, capturing the second set of images of the scene using the gimbal camera; and stitching the second set of images together to create the second panoramic image.

In a seventeenth aspect, the subject matter described in this specification can be embodied in the method of the preceding aspect that further includes displaying the second panoramic image on a user interface of a controller coupled with the UAV.

In an eighteenth aspect, the subject matter described in this specification can be embodied in the method of the preceding aspects, or any combination thereof, wherein stitching the first set of images together to create the first panoramic image of the scene comprises performing a first image registration algorithm on the first set of images to identify first correspondences between two or more of the images of the first set of images and performing a blending algorithm on the first set of images based on the correspondences, and wherein stitching the second set of images together to create the second panoramic image comprises performing a second image registration algorithm on the second set of images to identify second correspondences between two or more of the images of the second set of images and performing the blending algorithm on the second set of images based on the second correspondences.

In a nineteenth aspect, the subject matter described in this specification can be embodied in the method of the preceding aspects, or any combination thereof, wherein stitching the second set of images together to create the second panoramic image comprises performing a second image registration algorithm on the second set of images to identify second correspondences between two or more of the images of the second set of images and performing the blending algorithm on the second set of images based on the second correspondences.

In a twentieth aspect, the subject matter described in this specification can be embodied in the method of the preceding aspects, or any combination thereof, wherein the flight plan comprises one or more maneuvers to reposition the UAV to a new position at which to capture one or more of the images of the second set of images, and wherein identifying the flight plan comprises identifying the new position based on a previous position of the UAV associated with the first set of images and identifying the one or more maneuvers to direct the UAV from a current position to the new position.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. An unmanned aerial vehicle (UAV), comprising:
   a flight control system;
   a propulsion system operatively coupled with the flight control system and configured to propel the UAV as directed by the flight control system; and
   an image system comprising navigational cameras and a gimbal camera, wherein the image system is configured to:
   capture a first set of images of a scene using the navigational cameras, wherein each one of the first set of images corresponds to a different one of the navigational cameras;
   stitch the first set of images together to create a first panoramic image of the scene;
   identify a flight plan for capturing a second set of images using the gimbal camera with which to create a second panoramic image of the scene based on the first panoramic image, wherein the flight plan includes maneuvers for positioning the UAV according to a location of the gimbal camera on the UAV relative to locations of the navigational cameras on the UAV;
   while executing the flight plan via the propulsion system, capture the second set of images of the scene using the gimbal camera; and
   stitch the second set of images together to create the second panoramic image.

2. The UAV of claim 1, further comprising a transmitter configured to provide the second panoramic image to a controller associated with the UAV.

3. The UAV of claim 1, wherein to stitch the first set of images together to create the first panoramic image of the scene, the image system is configured to perform an image registration algorithm on the first set of images to identify correspondences between two or more of the images of the first set of images and to perform a blending algorithm on the first set of images based on the correspondences.

4. The UAV of claim 1, wherein the image system is further configured to:
   provide the first panoramic image of the scene for display on a user interface; and
   identify the flight plan responsive to receiving a request for capture of a high resolution version of the first panoramic image;
   wherein the second panoramic image comprises the high resolution version of the first panoramic image.

5. The UAV of claim 1, wherein to stitch the second set of images together to create the second panoramic image, the image system is configured to perform an image registration algorithm on the second set of images to identify correspondences between two or more of the images of the second set of images and to perform a blending algorithm on the second set of images based on the correspondences.

6. The UAV of claim 1, wherein the second panoramic image is a high resolution version of the first panoramic image, and wherein the first panoramic image and the second panoramic image are one of a 180-degree vertical panoramic image, a 180-degree horizontal panoramic image, and 360-degree panoramic image.

7. The UAV of claim 1, wherein the navigational cameras comprise three navigational cameras located on a top side of the UAV and three navigational cameras located on a bottom side of the UAV.

8. A method of producing panoramic images onboard an unmanned aerial vehicle (UAV), the method comprising:
- capturing a first set of images of a scene using navigational cameras onboard a UAV, wherein each one of the first set of images corresponds to a different one of the navigational cameras;
- stitching the first set of images together to create a first panoramic image of the scene;
- identifying a flight plan for capturing a second set of images using a gimbal camera onboard the UAV with which to create a second panoramic image of the scene based on the first panoramic image, wherein the flight plan includes maneuvers for positioning the UAV according to a location of the gimbal camera on the UAV relative to locations of the navigational cameras on the UAV;
- while executing the flight plan, capturing the second set of images of the scene using the gimbal camera; and
- stitching the second set of images together to create the second panoramic image.

9. The method of claim 8, further comprising displaying the second panoramic image on a user interface of a controller coupled with the UAV.

10. The method of claim 8, wherein stitching the first set of images together to create the first panoramic image of the scene comprises performing a first image registration algorithm on the first set of images to identify first correspondences between two or more of the images of the first set of images and performing a blending algorithm on the first set of images based on the correspondences.

11. The method of claim 8, wherein stitching the second set of images together to create the second panoramic image comprises performing a second image registration algorithm on the second set of images to identify second correspondences between two or more of the images of the second set of images and performing the blending algorithm on the second set of images based on the second correspondences.

12. The method of claim 8, further comprising:
- providing the first panoramic image of the scene for display on a user interface; and
- identifying the flight plan responsive to receiving a request for capture of a high resolution version of the first panoramic image;
- wherein the second panoramic image comprises the high resolution version of the first panoramic image.

13. A computing apparatus, comprising:
- one or more computer-readable storage media; and
- program instructions stored on the one or more computer-readable storage media that, based on being read and executed by a processing system, direct an unmanned aerial vehicle (UAV) to at least:
  - capture a first set of images of a scene using navigational cameras onboard the UAV, wherein each one of the first set of images corresponds to a different one of the navigational cameras;
  - stitch the first set of images together to create a first panoramic image of the scene;
  - identify a flight plan for capturing a second set of images using a gimbal camera onboard the UAV with which to create a second panoramic image of the scene based on the first panoramic image, wherein the flight plan includes maneuvers for positioning the UAV according to a location of the gimbal camera on the UAV relative to locations of the navigational cameras on the UAV;
  - while executing the flight plan, capture the second set of images of the scene using the gimbal camera; and
  - stitch the second set of images together to create the second panoramic image.

14. The computing apparatus of claim 13, wherein the program instructions further direct the UAV to display the second panoramic image on a user interface of a controller coupled with the UAV.

15. The computing apparatus of claim 13, wherein to stitch the first set of images together to create the first panoramic image of the scene, the program instructions direct the UAV to perform an image registration algorithm on the first set of images to identify correspondences between two or more of the images of the first set of images and to perform a blending algorithm on the first set of images based on the correspondences.

16. The computing apparatus of claim 13, wherein the flight plan comprises one or more maneuvers to reposition the UAV to a new position at which to capture one or more of the images of the second set of images.

17. The computing apparatus of claim 16, wherein the program instructions further direct the UAV to:
- provide the first panoramic image of the scene for display on a user interface; and
- identify the flight plan responsive to receiving a request for capture of a high resolution version of the first panoramic image;
- wherein the second panoramic image comprises the high resolution version of the first panoramic image.

18. The computing apparatus of claim 13, wherein to stitch the second set of images together to create the second panoramic image, the program instructions direct the UAV to perform an image registration algorithm on the second set of images to identify correspondences between two or more of the images of the second set of images and to perform a blending algorithm on the second set of images based on the correspondences.

19. The computing apparatus of claim 13, wherein the second panoramic image is a high resolution version of the first panoramic image, and wherein the first panoramic image and the second panoramic image are one of a 180-degree vertical panoramic image, a 180-degree horizontal panoramic image, and 360-degree panoramic image.

20. The computing apparatus of claim 13, wherein the navigational cameras comprise three navigational cameras located on a top side of the UAV and three navigational cameras located on a bottom side of the UAV.

* * * * *